May 19, 1925.  
E. S. MILLER  
1,538,344  
VARIABLE CONDENSER  
Filed Feb. 1, 1923  
2 Sheets-Sheet 1

INVENTOR  
Ellsworth S. Miller  
BY  
Pennie, Davis, Marvin & Edmonds  
ATTORNEY May 19, 1925.
E. S. MILLER
VARIABLE CONDENSER
Filed Feb. 1, 1923        2 Sheets-Sheet 2
1,538,344
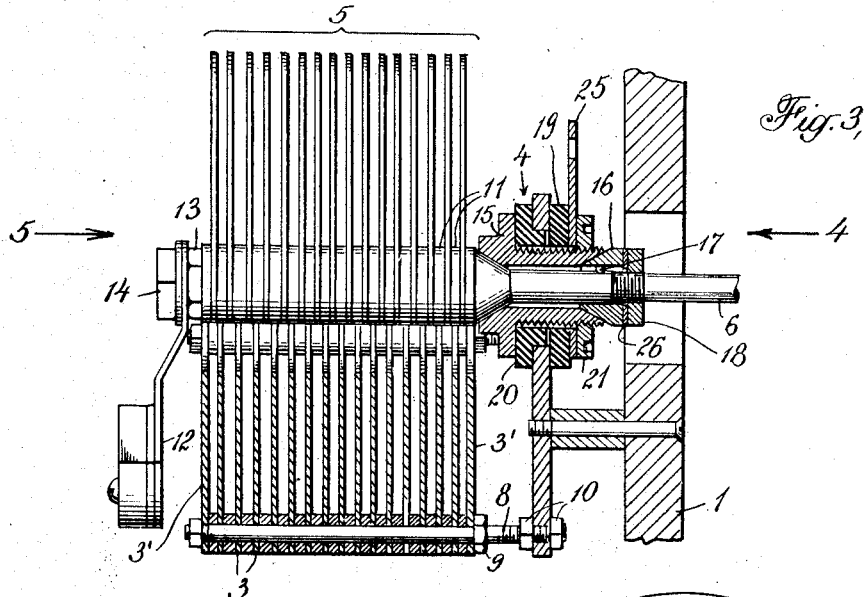
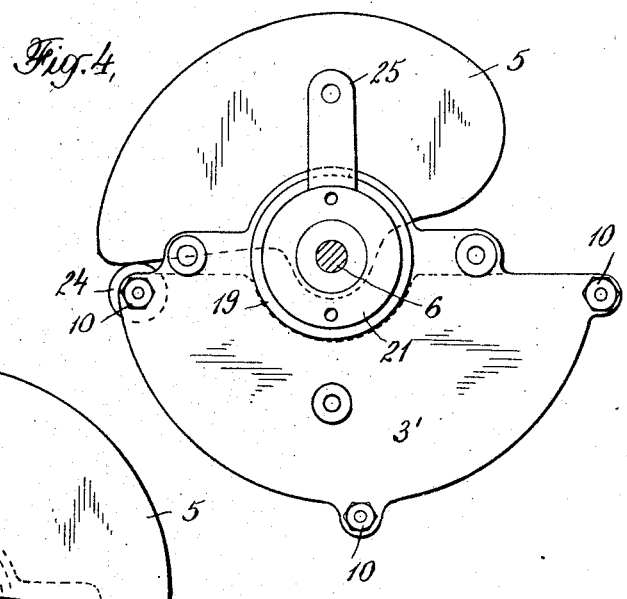
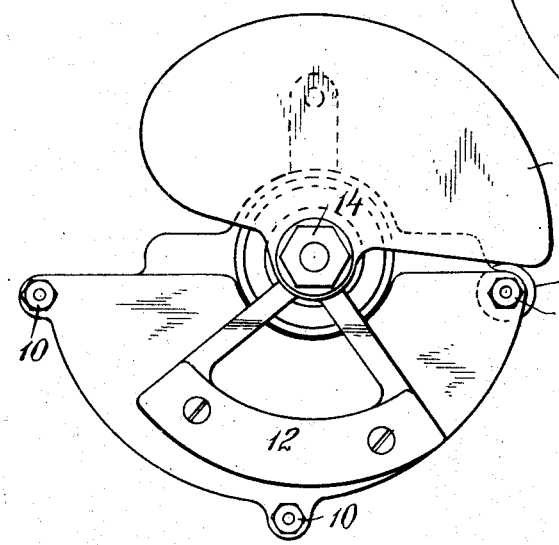
INVENTOR
Ellsworth S. Miller
BY
ATTORNEY Patented May 19, 1925.

1,538,344

UNITED STATES PATENT OFFICE.

ELLSWORTH S. MILLER, OF PHILADELPHIA, PENNSYLVANIA.

VARIABLE CONDENSER.

Application filed February 1, 1923. Serial No. 616,300.

*To all whom it may concern:*

Be it known that I, ELLSWORTH S. MILLER, a citizen of the United States, residing at Philadelphia, in the county of Philadelphia, State of Pennsylvania, have invented certain new and useful Improvements in Variable Condensers; and I do hereby declare the following to be a full, clear, and exact description of the invention, such as will enable others skilled in the art to which it appertains to make and use the same.

This invention relates to variable electrostatic condensers, and, more particularly, to variable air condensers.

One of the largest factors in the cost of production of variable air condensers is the time required for assembling and adjusting; in fact the cost of the parts is, generally, a comparatively small part of the total cost of an assembled condenser. With the recognition of this fact it became apparent that the possibilities of reducing production costs were, for the most part, to be found in the simplification of the assembling operations.

The primary object of the invention is the provision of a high grade variable condenser at a relatively low cost, and to this end the invention consists in certain structural improvements whereby the assembling operations are greatly simplified and the cost thereof accordingly reduced.

The principal feature of the invention resides in an arrangement whereby the rotatable plates, together with the shaft on which they are mounted, may be removed or inserted as a unit from and into the remainder of the structure without disturbing the stationary portion of the condenser. By virtue of such arrangement the stationary portion of the condenser, including the fixed plates, may be assembled and adjusted independently of the rotatable plates, and likewise, the latter plates may be assembled and adjusted on the shaft independently of the stationary portion of the condenser. The stationary portion thus forms one unit and the movable portion another unit, and these units may be assembled together or taken apart very quickly without disturbing the adjustments of either set of plates.

A single cone type bearing is provided in which the shaft is journaled, and it is due largely to the use of this single bearing instead of two bearings as have heretofore been provided for supporting the shafts of variable condensers, that the advantageous feature previously referred to is made possible. Like all cone bearings, that used in the present instance is adjustable to compensate for wear, and the adjustments may be easily made so that there is neither looseness nor excessive friction in the bearing. By reason of the provision of a suitable spring washer which functions to automatically take up any slack in the bearing which might otherwise exist due to wear and other causes, frequent adjustments of the bearing to take up slack are obviated.

Another feature of the invention contributing to economy of manufacture consists in providing insulating stop-washers which fit over the metal separators between the fixed plates. These stop-washers, the function of which is to prevent electrical connection between the fixed and movable plates in the zero and maximum positions, are usually made of commercial fibre or other insulating material the thickness of which is rather inexact besides having a relatively large coefficient of expansion. Heretofore, it has been the practice to use these stop-washers as part of the spacing elements between the fixed plates, but it was found that, due to the variable thickness of the commercial product and the variation due to expansion and contraction, considerable inaccuracy in the spacing of the fixed plates accrued. While the inaccuracy of plate spacing due to a single washer would not likely be serious, the total inaccuracy due to the added variations of several such washers is frequently critical. According to the present invention, the spacing of the plates is effected entirely by metal separators the thickness of which is very exact, while the insulating washers, which are of less thickness than the metal separators, are forced outside of the latter.

For a clearer understanding of the invention, reference will now be made to the accompanying drawings, which show the preferred embodiment of the invention. It is, however, to be understood that the invention is not in any way limited to the structure shown and described herein, but only by the scope of the appended claims.

Fig. 3 is a cross-sectional view of the condenser assembled;

Fig. 4 is an end view of the condenser looking in the direction of the arrow 4 in Fig. 3; and Fig. 5 is a view of the opposite end of the condenser as indicated by the arrow 5 in Fig. 3.

Figure 1:
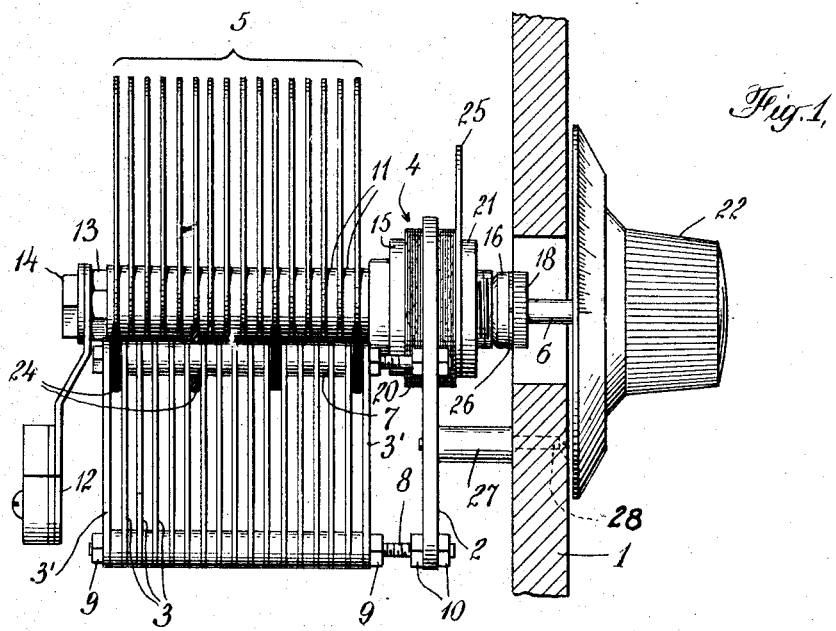
Fig. 1 is a side elevation of an assembled condenser in accordance with the invention.

In Fig. 1 there is shown a side elevation of an assembled condenser mounted on a panel 1. The stationary portion of this condenser is a self-contained unit comprising the mounting plate 2, fixed plates 3 and 3′, and bearing 4, together with a number of smaller parts which will be referred to more specifically hereinafter.

The movable portion of the condenser is also a self-contained unit, and comprises the rotatable plates 5 and shaft 6, together with a number of smaller parts which will likewise be referred to more specifically hereinafter. The fixed plates 3 and 3′ differ only in that the latter are of greater thickness than the former, for the purpose of obtaining greater mechanical strength. The several fixed plates are separated at three points by the metal separators 7, which are of very exact thickness. Three studs 8 pass through the entire fixed plate pileup and separators 7, as well as through the supporting plate 2. The fixed plates are held together by means of nuts 9, while adjustments of the fixed plate pileup with respect to the mounting plate 2 may be obtained by means of nuts 10, which also serve for securing the fixed plates to the mounting plate.

The rotatable plates 5 are mounted on shaft 6 and properly spaced apart by metal separators 11. A counter weight 12, the function of which is to balance the rotatable plates 5, is also mounted on shaft 6. The rotatable plates 5 are clamped on to the shaft 6 by means of nut 13, while the counter weight 12 is clamped thereon by means of nut 14.

The bearing 4 comprises a metal bushing 15 having its end portions bored conically to receive the conical portion 6ª of shaft 6 and the conical washer 16. The latter is bored to fit shaft 6, and is provided with a slot 16′ in which pin 17 is adapted to slide. A thread 6ᵇ is provided on shaft 6, with which nut 18 engages. As is clearly shown in Fig. 3, this nut functions to hold shaft 6 in the bearing. A spring washer 26, interposed between nut 18 and the conical washer 16, functions not only to lock the nut 18, but also as a spring for seating the conical portion 6ª of the shaft and the conical surface of washer 16 in the bushing 15 and automatically taking up any slack or looseness between the shaft and bearing which might otherwise exist. It will be seen that with this bearing construction the proper alignment of the rotatable plates with respect to the fixed plates may be maintained without undue friction in the bearing, and that the adjustment of the bearing to secure this alignment is not critical, due to the tension exerted by spring washer 26. The bushing 15 is mounted on plate 2, but insulated therefrom by means of washer 19 and bushing 20, which are of insulating material and preferably of a suitable form of porcelean. Bushing 15 is provided with an external thread which is engaged by lock nut 21, whereby the several parts of the bearing are clamped in place.

As in all condensers of this type, the movable plates 5 are alternately interleaved with the fixed plates 3, 3′, and are rotatable with the shaft 6 to vary the electrostatic capacity. A knob and dial 22 is preferably provided for rotating the shaft. Four insulating washers 24, which may be of vulcanized fibre, rubber, or any other suitable insulating material, are shown in Fig. 1. Each of these washers is mounted on and supported by one of the metal separators 7, and, as shown in Fig. 5, their function is that of a stop for the rotatable plates. In Fig. 5 the rotatable plates are shown in one extreme position, which is that of approximately zero capacity. When these plates are rotated to the maximum capacity position, they are again stopped by engagement with the opposite sides of the washers 24. These stop-washers are preferably of slightly less width than the separators 7, and accordingly, any variations in their thickness, so long as they do not exceed the thickness of the separators, has no effect on the spacing of the fixed plates. One of these stop-washers is shown in cross section in Fig. 1, for the purpose of more clearly illustrating the fact that it is mounted on the exterior of the metal separator. A metal soldering terminal 25, having an opening through which the bushing 15 passes, provides a convenient means for making connections with the movable plates. Connections to the fixed plates may be conveniently made by attaching a soldering terminal to any one of the studs 8. The three screws 28, by which the condenser is secured to the panel 1, are tapped into the mounting plate 2, and suitable metal spacers 27 are provided for holding the condenser in the proper position with respect to the panel.

Figure 2:
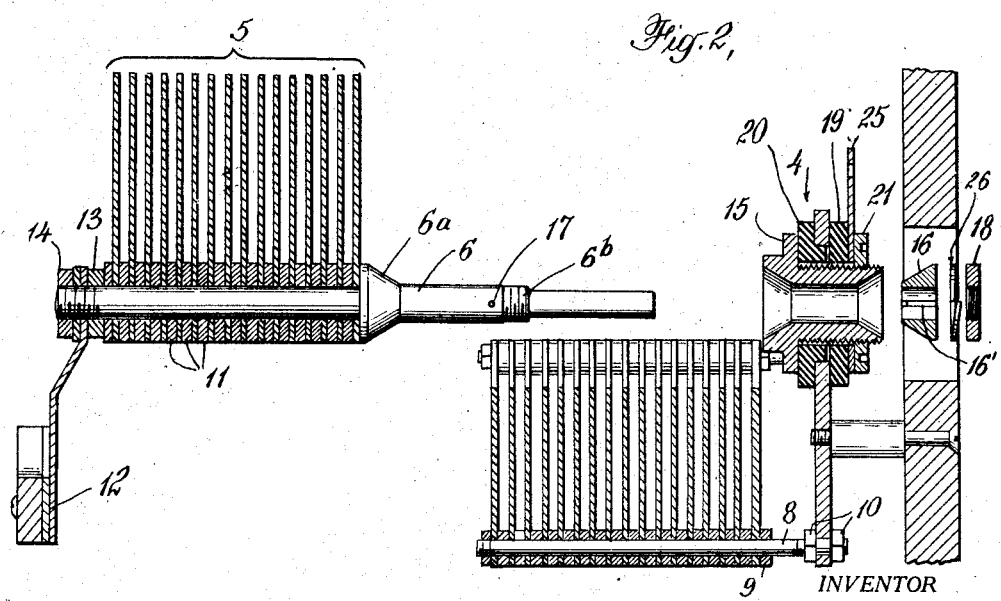
Fig. 2 is a cross-sectional view of the same condenser showing the movable unit and fixed unit separated.

From an examination of Figs. 2 and 3 it will be seen that the stationary and movable units can be completely assembled quite independently of each other and that the two units can be put together and taken apart very quickly. Not only does this provision greatly expedite and reduce the cost of assembling, but it is a very convenient arrangement from the standpoint of the user, particularly in the event of any of the plates becoming bent and requiring readjustment.

A further advantage of this construction consists in the fact that good electrical contact may be always maintained between the shaft 6 and the bearing because any lost motion which may develop due to wear may be quickly taken up by simply turning the nut 18, which is knurled and is easily operated with the fingers.

I claim:

1. A variable electrostatic condenser comprising a set of fixed plates, means for supporting said fixed plates, a set of rotatable plates adapted to be variably interleaved with said fixed plates, a shaft for said rotatable plates, said rotatable plates and said shaft comprising a self-contained unit, a bearing for rotatably supporting said shaft, said bearing having a pair of opposed frustro-conical portions, said shaft having a frustro-conical portion registering with one of the said frustro-conical portions of said bearing, an apertured bushing having a frustro-conical exterior surface registering with the other frustro-conical portion of said bearing, said shaft extending through the aperture in said bushing, and a nut for adjustably securing said shaft in said bearing, said unit being adapted for removal from the condenser as a whole without disassembling said fixed plates or said means for supporting said fixed plates.

2. A variable electrostatic condenser comprising a set of fixed plates, means for supporting said fixed plates, a set of rotatable plates adapted to be variably interleaved with said fixed plates, a shaft for said rotatable plates, said rotatable plates and said shaft comprising a self-contained unit, a bearing for rotatably supporting said shaft, said bearing having a pair of opposed frustro-conical portions, said shaft having a frustro-conical portion registering with one of the said frustro-conical portions of said bearing, an apertured bushing having a frustro-conical exterior surface registering with the other frustro-conical portion of said bearing, said shaft extending through the aperture in said bushing, means for keying said bushing to said shaft so that the two are positively rotatable together, and a nut for adjustably securing said shaft in said bearing, said unit being adapted for removal from the condenser as a whole without disassembling said fixed plates or said means for supporting said fixed plates.

3. A variable electrostatic condenser comprising a set of fixed plates, means for supporting said fixed plates, a set of rotatable plates adapted to be variably interleaved with said fixed plates, a shaft for said rotatable plates, said rotatable plates and said shaft comprising a self-contained unit, a bearing for rotatably supporting said shaft, said bearing having a pair of opposed frustro-conical portions, said shaft having a frustro-conical portion registering with one of the said frustro-conical portions of said bearing, an apertured bushing having a frustro-conical exterior surface registering with the other frustro-conical portion of said bearing, said shaft extending through the aperture in said bushing, a keyslot in said bushing and a pin in said shaft, said pin engaging said keyslot whereby said bushing and shaft are rotatably interconnected and a nut for adjustably securing said shaft in said bearing, said unit being adapted for removal from the condenser as a whole without disassembling said fixed plates or said means for supporting said fixed plates.

4. A variable electrostatic condenser comprising a set of fixed plates, means for supporting said fixed plates, a set of rotatable plates adapted to be variably interleaved with said fixed plates, a shaft for said rotatable plates, said rotatable plates and said shaft comprising a self-contained unit, a bearing for rotatably supporting said shaft, said bearing having a pair of opposed frustro-conical portions, said shaft having a frustro-conical portion registering with one of the said frustro-conical portions of said bearing, an apertured bushing having a frustro-conical exterior surface registering with the other frustro-conical portion of said bearing, said shaft extending through the aperture in said bushing, a nut for adjustably securing said shaft in said bearing, and a spring washer interposed between said apertured bushing and said nut, said unit being adapted for removal from the condenser as a whole without disassembling said fixed plates or said means for supporting said fixed plates.

5. In a variable condenser, fixed plates, a movable plate interleaved between said fixed plates, a metal separator between said fixed plates, and a stop-washer of insulating material the thickness of which does not exceed that of said separator, said separator being inserted through said stop-washer.

6. In a variable condenser, fixed plates, a movable plate interleaved between said fixed plates, a metal separator between said fixed plates, and a stop-washer of insulating material the thickness of which does not exceed that of said separator, said stop-washer being mounted on said separator and supported thereby.

In testimony whereof I affix my signature.

ELLSWORTH S. MILLER.